United States Patent
Quartier et al.

(10) Patent No.: US 8,672,109 B2
(45) Date of Patent: Mar. 18, 2014

(54) DOUBLE CLUTCH TRANSMISSION AND DOUBLE CLUTCH TRANSMISSION ASSEMBLY METHOD

(75) Inventors: Georg Quartier, Aachen (DE); Peter Nissen, Roetger (DE); Gerd Hilger, Duren (DE)

(73) Assignees: SAIC Motor Corporation Limited, Shanghai (CN); Shanghai Automotive Gear Works, Shanghai (CN)

(*) Notice: Subject to any disclaimer, the term of this patent is extended or adjusted under 35 U.S.C. 154(b) by 719 days.

(21) Appl. No.: 12/742,313

(22) PCT Filed: Nov. 10, 2008

(86) PCT No.: PCT/DE2008/001837
§ 371 (c)(1),
(2), (4) Date: May 11, 2010

(87) PCT Pub. No.: WO2009/059597
PCT Pub. Date: May 14, 2009

(65) Prior Publication Data
US 2011/0005882 A1    Jan. 13, 2011

(30) Foreign Application Priority Data

Nov. 11, 2007 (DE) .......................... 10 2007 054 125
Sep. 5, 2008 (DE) .......................... 10 2008 045 791

(51) Int. Cl.
*F16D 21/06* (2006.01)
*F16H 3/093* (2006.01)

(52) U.S. Cl.
USPC ............... 192/48.611; 192/55.61; 192/110 B; 192/110 R; 74/330

(58) Field of Classification Search
USPC ............ 192/48.609, 48.611, 48.612, 48.618, 192/48.8, 48.9, 48.91, 55.61, 110 R, 10 B; 74/330
See application file for complete search history.

(56) References Cited

U.S. PATENT DOCUMENTS

| | | | | |
|---|---|---|---|---|
| 808,975 | A | * | 1/1906 | Dittbenner .................. 192/70.16 |
| 6,401,894 | B1 | * | 6/2002 | Merkel et al. ................ 192/48.9 |
| 6,929,107 | B2 | * | 8/2005 | Hegerath .................. 192/48.611 |
| 7,249,665 | B2 | * | 7/2007 | Heinrich et al. ........... 192/48.61 |
| 7,322,455 | B2 | * | 1/2008 | Vetter et al. .................. 192/48.9 |
| 7,350,635 | B2 | * | 4/2008 | De Maziere ............. 192/48.611 |

(Continued)

FOREIGN PATENT DOCUMENTS

| DE | 101 15 454 | 8/2002 |
|---|---|---|
| DE | 10 2005 037514 | 3/2006 |

(Continued)

*Primary Examiner* — David D Le
*Assistant Examiner* — Jacob S Scott (57) ABSTRACT

A narrow double clutch transmission to be mounted in a drive train with a drive unit comprises a clutch part and a transmission part with two sub-transmission units. The clutch part has one input hub connected with the drive unit and two output hubs, which are connected with two input shafts of two sub-transmission unit respectively. The two sub-transmission unit input shafts are arranged coaxially to each other. At the output side the input hub is connected with a damping mechanism, which is connected with two clutches. The two clutches and the damping mechanism are arranged in a clutch chamber filled with oil, which is sealed floatingly to a clutch cover. The output hub connected with the sub-transmission input shaft is axially supported by the sub-transmission unit input shaft.

16 Claims, 9 Drawing Sheets

(56) References Cited

U.S. PATENT DOCUMENTS 7,478,718 B2 * 1/2009 De Maziere ............. 192/48.611
7,631,739 B2 * 12/2009 Enstrom .................. 192/48.609
7,784,595 B2 * 8/2010 Bauer et al. ................ 192/55.61

FOREIGN PATENT DOCUMENTS

| DE | 102005045158 | * | 3/2007 |
| EP | A-1 226 992 | | 7/2002 |
| EP | 10 2005 045158 | | 3/2007 |

* cited by examiner

DOUBLE CLUTCH TRANSMISSION AND DOUBLE CLUTCH TRANSMISSION ASSEMBLY METHOD

CROSS REFERENCE TO RELATED PATENT APPLICATION

The present application is the U.S. national stage of PCT/DE2008/001837 filed on Nov. 10, 2008, which claims the priorities of the German patent application No. 102007054125.4 filed on Nov. 11, 2007 and German application No. 102008045791.4 filed on Sep. 5, 2008, which applications are incorporated herein by reference.

The invention is related, on the one hand, to a double clutch transmission to be mounted in a drive train with a drive unit, wherein the double clutch transmission comprises a clutch part and a transmission part with two sub-transmission units, wherein the clutch part has one input hub for an operative connection with the drive unit and two output hubs, which are, respectively, operatively connected with the input shaft of a sub-transmission unit, wherein the two sub-transmission unit input shafts are arranged coaxially to each other, wherein on the output side the input hub is operatively connected with a damping mechanism, which—on its side—is operatively connected on the output side with two clutches, and the output hubs are operatively connected, respectively, at the drive end with one of the clutches and wherein both the clutches and also the damping mechanism are arranged in a clutch chamber filled with oil, which is sealed floatingly to a clutch cover. On the other hand, the invention is related to a double clutch transmission to be mounted in a drive train with a drive unit, wherein the double clutch transmission comprises a clutch part and a transmission part with two sub-transmission units, wherein the clutch part has one input hub for an operative connection with the drive unit and two output hubs, which are, respectively, operatively connected with the input shaft of a sub-transmission unit, wherein the two sub-transmission unit input shafts are arranged coaxially to each other, wherein on the output side the input hub is operatively connected with a damping mechanism, which—on its side—is operatively connected on the output side with two clutches, and wherein the output hubs are operatively connected at the drive end with one of the clutches. In addition, the invention is related to a method for assembly of such a double clutch transmission in the drive train of a motor vehicle.

Generically, such a double clutch transmission has to be differentiated from a double clutch transmission according to EP 1 226 992 B1 or according to DE 10 2005 045 158 A1 which has a damper mounted between the drive unit and the clutches outside of the clutch housing. All assembly groups within the clutch housing, and particularly the input hub, are vibration-cushioned, particularly with respect to any axial vibrations, which could be generated by the drive unit. On the other hand, a similar double clutch transmission is known from DE 10 2005 025 773 A1 and, respectively, from the unpublished PCT/DE 2007/001700, in which the input hub is supported axially by the clutch housing and/or by a flexplate, while the output hubs are secured axially only by means of the respective clutch pots, wherein only the PCT/DE 2007/001700 reveals a floating seal between the input hub and a clutch cover which makes it possible to implement an axially more narrow design of the double clutch transmission.

This invention has the objective to present a generic double clutch transmission which has a narrow design and is reliable in operation.

The objective of the invention is solved by a double clutch transmission to be mounted in a drive train with a drive unit, wherein the double clutch transmission comprises a clutch part and a transmission part with two sub-transmission units, wherein the clutch part has one input hub for an operative connection with the drive unit and two output hubs, which are, respectively, operatively connected with the input shaft of a sub-transmission unit, wherein the two sub-transmission unit input shafts are arranged coaxially to each other, wherein on the output side the input hub is operatively connected with a damping mechanism, which—on its side—is operatively connected on the output side with two clutches, and the output hubs are operatively connected, respectively, at the drive end with one of the clutches, wherein both the clutches and also the damping mechanism are arranged in a clutch chamber filled with oil, which is sealed floatingly to a clutch cover, and wherein the double clutch transmission is characterized in that the output hub, which is operatively connected with the sub-transmission unit input shaft mounted axially inside, is supported axially by the sub-transmission unit input shaft mounted axially inside.

This permits a very narrow design, in particular without expensive axial support in the area from the input hub to the drive unit, so that in this area, which is particularly critical with respect to the design length, a narrow design is possible. In particular, thanks to the direct axial supporting of the output hub by the sub-transmission unit input shaft mounted axially inside, it is possible to implement a particularly narrow axial design of the area of the axial support, so that in this way the support between the input shaft of the first sub-transmission unit and the input hub can have a particularly narrow design.

In relation with the above, the term "input hub" means a rotating design group, which can be built of one or several components and serves as a torsional moment connection to at least one sheet metal part. The same is true for the "output hubs", which generally build a connection between one clutch pot and one transmission input shaft, while the input hub generally transmits a torsional moment between an input plate of a torsional vibration damper and the crank shaft or the plate of an axial damper, such as, for example, a flexplate.

In one embodiment, which is preferable in this respect, the output hub, which is operatively connected with the sub-transmission unit input shaft that is axially mounted inside, is secured against a movement in the direction of the drive unit. The axial safeguard of this kind guarantees reliably and in the long term that the output hub cannot come too close in a critical way to the components which are arranged on the drive end.

In order to guarantee that the output hub does not have a critical displacement with respect to the transmission part side, i.e. it does not make a critical movement on the drive side, it is advantageous, when the output hub, which is operatively connected with the sub-transmission unit input shaft that is axially mounted inside, is secured against a movement in the direction of the drive unit at the sub-transmission unit input shaft that is axially outside and/or at the output hub which is operatively connected with the sub-transmission unit input shaft that is axially mounted outside.

Here, the terms "output side" and "drive end" mean, respectively, assembly groups, which are arranged one to the other in the drive train with respect to the force and, respectively, the torsional moment influences generated by the drive unit. On the other hand, a movement or direction, which is oriented towards the drive unit or the transmission, designates only a movement or direction which is parallel to the main axle of the clutch assembly in the corresponding direction.

The objective of the invention is also solved by a double clutch transmission to be mounted in a drive train with a drive unit, wherein the double clutch transmission comprises a clutch part and a transmission part with two sub-transmission units, wherein the clutch part has one input hub for an operative connection with the drive unit and output hubs, which are, respectively, operatively connected with the input shaft of a sub-transmission unit, wherein the two sub-transmission unit input shafts are arranged coaxially to each other, wherein on the drive side the input hub is operatively connected with a damping mechanism, which—on its side—is operatively connected on the output side with two clutches, and the output hubs are operatively connected, respectively, at the drive end with one of the clutches, and wherein both the clutches and also the damping mechanism are arranged in a clutch chamber filled with oil, which is sealed floatingly to a clutch cover, and at which the output hub operatively connected with the sub-transmission unit input shaft that is axially mounted inside is secured on the sub-transmission unit input shaft that is axially mounted inside by means of an adjustment screw.

The double clutch transmission can be assembled quickly and reliably, independently of the other characteristics of the present invention, by means of an adjustment screw for securing the output hub, which is operatively connected by means of an adjustment screw with the sub-transmission unit input shaft that is axially mounted inside. This is true, in particular, when the adjustment screw runs force-free and the sub-transmission unit input shaft, which is axially mounted inside or, respectively, the output hub, which is operatively connected to it, are supported directly by the input hub or the input shaft. In contrast to the teaching according to DE 10 2005 045 158 A1, which in any case already shows a radial damper outside of the clutch housing so that the components that follow in the drive train are considerably relieved, which, however, is relatively broadly designed, the adjustment screw can be considerably relieved and designed shorter.

A very compactly designed double clutch transmission can be implemented when the floating clutch cover seal at the clutch cover is arranged on the input hub. On the one hand, a sufficiently large sealing surface, to which the clutch cover sealing can correspond floatingly, can be provided without any problems at the outside circumference of the input hub. On the other hand, in this case the clutch cover can be built easily from design point of view in the area oriented towards the input hub, so that the clutch cover seal can be arranged onto the clutch cover on a large surface and thus reliably.

Another advantageous embodiment, which is independent from the other characteristics of the present invention, is a double clutch transmission to be mounted in a drive train with a drive unit, wherein the double clutch transmission comprises a clutch part and a transmission part with two sub-transmission units, wherein the clutch part has one input hub for operative connection with the drive unit and two output hubs, which are, respectively, operatively connected with the input shaft of a sub-transmission unit, wherein the two sub-transmission unit input shafts are arranged coaxially to each other, wherein on the output side the input hub is operatively connected with a damping mechanism, which—on its side— is operatively connected on the output side with two clutches, and the output hubs are operatively connected, respectively, at the drive end with one of the clutches and wherein the double clutch transmission is characterized in that the output hub, which is operatively connected with the sub-transmission unit input shaft that is axially mounted inside is secured on the sub-transmission input shaft that is axially mounted inside by means of an adjustment screw which is only loaded axially.

In an advantages way, the axial support of the output hub by the sub-transmission unit input shaft, which is axially mounted inside, by means of an adjustment screw, which is only loaded axially, can be realized also in double clutch transmissions which are implemented without a clutch chamber filled with oil. In particular, in one of these embodiments the floatingly supported clutch cover seal can be skipped, whereby the double clutch transmission can be built in a more compact form.

In addition to the solutions that have already been discussed, the objective of the invention is also solved by a double clutch transmission to be mounted in a drive train with a drive unit, wherein the double clutch transmission comprises a clutch part and a transmission part with two sub-transmission units, wherein the clutch part has one input hub for an operative connection with the drive unit and two output hubs, which are, respectively, operatively connected with the input shaft of a sub-transmission unit, wherein the two sub-transmission unit input shafts are arranged coaxially to each other, wherein on the output side the input hub is operatively connected with a damping mechanism, which—on its side— is operatively connected on the output side with two clutches, and the output hubs are operatively connected, respectively, at the drive end with one of the clutches, and wherein the output hub, which is operatively connected with the sub-transmission unit input shaft that is axially mounted inside, is secured on the sub-transmission unit input shaft, which is axially mounted inside, by means of an adjustment screw and is supported by the input hub.

In case the output hub is secured to the sub-transmission unit input shaft not only by means of an adjustment screw, which is only loaded axially, but in addition is also supported radially by the input hub, the axial guide can be built in a particularly compact form. For example, at the outside circumference of an output hub, which is supported by the input shaft, an angular ball bearing is provided, which is arranged in the elaborate bearing area of an input hub of a drive unit. Therefore, also the combination of the features of this solution, independently of the other characteristics of the present invention, advantageously improves a generic double clutch transmission.

Another solution, which is also advantageous without the other characteristics of the present invention, provides a double clutch transmission to be mounted in a drive train with a drive unit, wherein the double clutch transmission comprises a clutch part and a transmission part with two sub-transmission units, wherein the clutch part has one input hub for an operative connection with the drive unit and two output hubs, which are, respectively, operatively connected with the input shaft of a sub-transmission unit, wherein the two sub-transmission unit input shafts are arranged coaxially to each other, wherein on the drive side the input hub is operatively connected with a damping mechanism, which—on its side— is operatively connected on the output side with two clutches, and the output hubs are operatively connected, respectively, at the drive end with one of the clutches and wherein both the clutches and also the damping mechanism are arranged in a clutch chamber filled with oil, which is sealed floatingly to a clutch cover, wherein the central opening of the input hub is sealed by means of a clutch chamber seal. In this way, the design of a double clutch transmission can be simplified independently of the other characteristics of the present invention.

Here, the term "central opening" describes a main opening of a hub. The central opening can, in addition to accommodating components of the double clutch transmission, actually serve as an access to other components of the double clutch transmission, such as, for example, the above-mentioned adjustment screw. The latter applies, in particular, to the assembled state of the double clutch transmission.

As regards the assembly and disassembly and/or the maintenance operations, in an advantageous embodiment the central clutch chamber sealing can be built in a detachable form.

The clutch chamber sealing can have many forms. In one embodiment, which is simple from design point of view, the central clutch chamber sealing includes a stopper secured on the input hub.

It is understood that this stopper can be secured in different ways on the input hub. As regards the rotation movements of the input hub, a reliable secure mounting of the stopper on the input hub can be achieved, in particular, when the stopper is secured by means of a securing ring.

In addition or alternatively to the stopper, the central clutch chamber seal on the input hub can include a screw. For example, a meander screw can be used by means of which, in the corresponding rotation direction, oil can be fed always in the direction of the clutch chamber which is filled with oil. In an advantageous manner, in this way it can be prevented that a large amount of oil could be present unimpededly and constantly in the area of any sealing plate of the clutch chamber seal.

In order to secure the adjustment screw that has been described above or any other adjustment screw in a loss-proof manner to the input shaft of the first sub-transmission unit, it is advantageous when the central opening has a smaller diameter than the adjustment screw. With the smaller diameter of the central opening, it is guaranteed that the adjustment screw, in particular during the assembly, cannot get lost. In such a case, the central opening can be used advantageously also as an access opening through which the adjustment screw can be accessible even in the operational state of the double clutch transmission. Preferably, the adjustment screw can be provided with a screw head that comprises an inside hexagon socket. In this way, the adjustment screw can be accessed with a relatively narrowly designed tool and the adjustment can be performed without any problem as soon as a seal has been removed from the central opening of the input hub.

As regards the damper, which is used in the invention, it is obvious that, depending on the design of the double clutch transmission and the vibrations that have to be damped, various dampers can be used. However, if a rotational vibration damper is used as a damping device, the generated vibrations can be damped in a particularly efficient manner, especially in circumference direction of rotating transmission components. The vibrations, which essentially appear in the direction of a rotation axle, i.e. axially in the drive train of the double clutch transmission, can be damped very well in a smaller design space by means of a flexplate, if needed.

The objective of the present invention includes also a method for assembling a double clutch transmission in the drive train of a motor vehicle, wherein a central clutch chamber seal of an input hub is loosened, one output hub operatively connected with an axially mounted inside sub-transmission unit input shaft is adjusted on the axially mounted inside sub-transmission unit input shaft, and, finally, it is closed in the central clutch chamber seal.

Double clutch transmissions, in particular as they have been described above, can not only be designed in an extremely narrow manner, but they can be also assembled advantageously when the output hub on the axially mounted inside sub-transmission unit input shaft can be adjusted through a central opening of the input hub which can be closed by a clutch chamber seal. By using a procedure of this kind, a transmission component, in particular one on a drive unit, can be easily assembled, but also quickly disassembled, so that not only an assembly, but also a disassembly, for example during maintenance operations, can be performed in a particularly advantageous manner. In particular, the adjustment of an axial or radial bearing between an input shaft of a first sub-transmission unit and an input hub of a drive unit can be performed advantageously when the adjustment can be performed by means of an adjustment screw, that can ideally be accessed through a central opening of the input hub.

Additional advantages, objectives and features of the present invention will be described below in the discussion of the figures, in which, as an example, a double clutch transmission with alternative connection examples between a drive unit and a transmission part of the double clutch transmission is shown. The same and/or in the same way functioning components and/or component groups are designated with the same reference numbers in the discussion of the embodiments.

Figure 1:
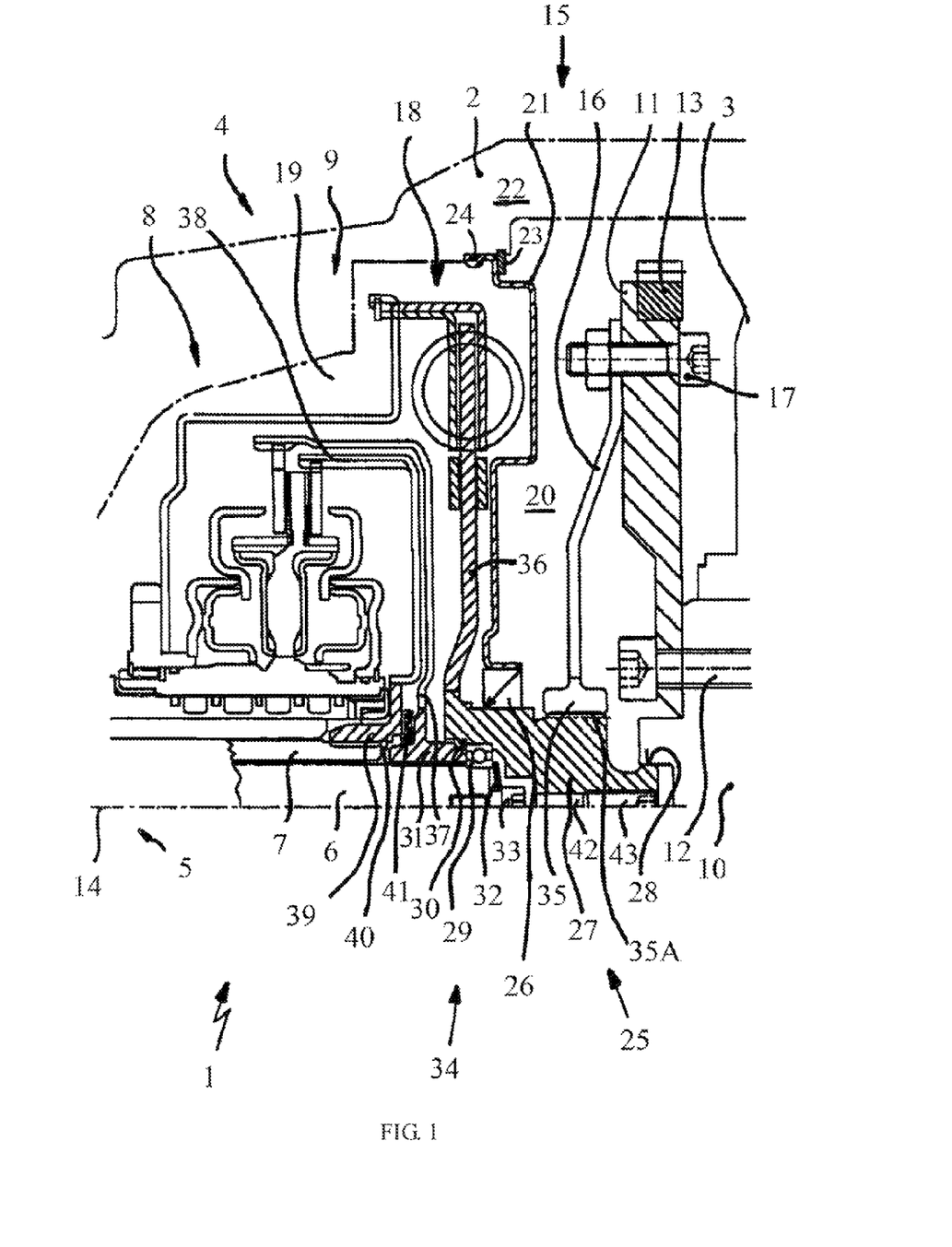
FIG. 1 A first double clutch transmission, wherein the drive unit is defined only by its input shafts.

The drive train 1 of the double clutch transmission 2 (shown in FIGS. 1 and 2) of a motor vehicle, which is not shown, comprises essentially a drive unit 3, a clutch part 4 and a transmission part 5, wherein the transmission part 5 in the drawing according to FIG. 1 is defined only by its input shafts 6 and 7. The first input shaft 6 hereby belongs to the first sub-transmission unit of the transmission part 5. According to that, the second input shaft 7 is assigned to the second sub-transmission unit of the transmission part 5—which is not shown here.

In this embodiment, the clutch part 4 comprises a first clutch 8 and a second clutch 9, through which the transmission part 5 can be connected to or separated from the drive unit 3.

The drive unit 3 is represented in the drawing in FIG. 1 essentially by a crank shaft 10 and a flywheel 11, wherein the flywheel 11 is flanged to the crank shaft 10 by means of a plurality of crank shaft screws 12 (which are shown here generically). A starter ring gear 13 is provided radially, outside, on the flywheel 11.

The crank shaft 10 and the two input shafts 6 and 7 are symmetrically pivotable around a common rotational axle 14 of the drive train 1.

In order to dampen, in particular, axial vibrations within the drive train 1 directly at the drive unit 3, an axial vibration damper 15 is provided at the drive end between the clutch part 4 and the drive unit 3, which is screwed onto the flywheel 11 in the form of a flexplate 16 by means of a screw connection 17. In order to additionally be able to dampen any undesirable vibrations in the rotation direction of the drive train 1, a torsional vibration damper 18 is provided between the clutch part 4 and the flexplate 16.

Here, the torsional vibration damper 18 and the two clutches 8, 9 of the clutch part 4 are arranged in the clutch chamber 19, which is filled with oil, while the drive unit 3, in particular the flywheel 11 and the axial vibration damper 15, are arranged in a antechamber 20 that is spatially separate from the clutch chamber 19. The antechamber 20 is free of oil.

The spatial separation between the clutch chamber 19 and the antechamber 20 is achieved by means of the clutch cover 21, wherein the clutch cover 21 is fastened to the transmission housing 22 of the double clutch transmission 2 and sealed. Here, the fastening is achieved by means of the holding ring 23 and the sealing by means of an O-ring seal 24.

The clutch cover 21 is sealed with respect to the rotating components 25 of the drive train 1 by means of the clutch chamber seal 26. For this purpose, the clutch chamber seal 26 is in contact, on the one hand, with the clutch cover 21 and, on the other hand, with the input hub 27 of the drive unit 3.

Figure 2:
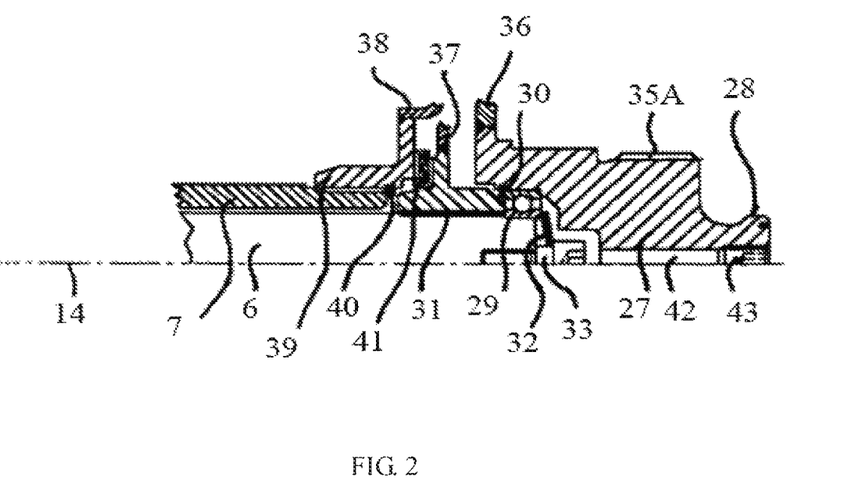
FIG. 2 A section from FIG. 1, wherein, as it has already been shown in FIG. 1, the first output hub due to the bearing seat of a ball bearing, which embeds radially on the first input shaft, wherein an adjustment spring and an adjustment screw are supported axially by the first input shaft, as well as one meander screw seal a central opening with cylindrical form in the input hub.

The input hub 27 is supported on the crank shaft 10 by an axial guide 28. At the transmission side, the input hub 27 is supported by means of the angular ball bearing 29 on the first input shaft 6. The angular ball bearing 29 is fixed on the input hub 27 by means of the securing ring 30 and, in addition, is clamped to the first input shaft 6, similarly to a floating bearing, between the first output hub 31, which is connected to the input shaft in a torque-proof manner, and an adjustment spring 32. The spring force of the adjustment spring 32 can be set by means of the adjustment screw 33. Here, the adjustment screw 33 can be axially screwed in more or less into the first input shaft 6.

In an advantageous way, by means of the here described input hub 27, the angular ball bearing 29, the first output hub 31, as well as the adjustment spring 32 and the adjustment screw 33, a very compactly built axial and radial guide 34 of these components is guaranteed, through which the axial and radial guide 34 can be built very short. This again benefits the very narrow design of the present double clutch transmission 2, so that it occupies less space than the hitherto existing double clutch transmissions, particularly in power-driven vehicles.

In particular, the input hub 27 of the drive unit 3 does not only serve for implementation of the present axial and radial guide 34, but, in addition, also as a seat for an axial vibration damper hub 35 which builds one unit with the flexplate 16. The seat in this embodiment is built in a simple way by means of the spline connection 35A. In addition, the input hub 27 is connected to a torsional vibration damper drive 36.

The first output hub 31 of the transmission part 5 is connected with a first clutch pot 37 of the clutch part 4, while a second clutch pot 38 is connected with the second input shaft 7 of the transmission part 5 through a second output hub 39. The second output hub 39 is fixed to the second input shaft 7 by means of an output hub securing ring 40. An axial slide bearing 41 is provided between the first output hub 31 and the second output hub 39, so that, on the one hand, the first output hub 31 can be supported on the seconds output hub 39 and the second output hub 39 can, in addition, be supported on the angular ball bearing 29 provided in the first input shaft 6 via the first output hub 31.

Since in this embodiment the clutch chamber 19 extends up to the input hub 27 and the input hub 27 represents a limit to the clutch chamber 19, it is necessary to make the central opening 42 of the input hub 27 oil-proof as well. In order to achieve an oil-proof condition in the central opening 42 in a reliable manner, the input hub 27 is provided with a meander screw 43, by means of which the oil that has reached the central opening 42 can always be transported in direction of the clutch chamber 19. In the case of a removed meander screw 43, the adjustment screw 33, particularly its inside hexagon head, can be accessed sufficiently well by means of a suitable tool through the central opening 42, so that by using the adjustment screw 33 the spring force of the adjustment spring 32 can be set, or the adjustment screw can be loosen and tightened again. Furthermore, the central opening 42 is built with a small diameter, so that the adjustment screw 33 is arranged in a loss-proof manned.

Figure 3:
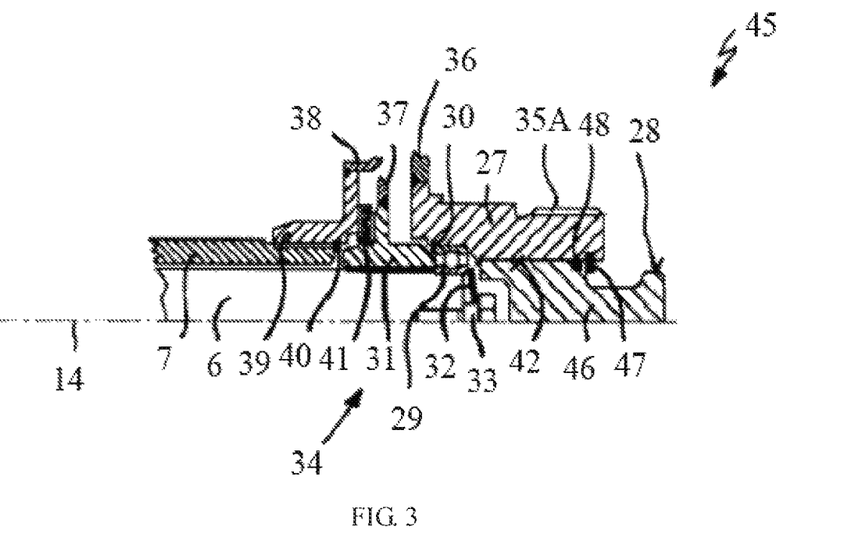
FIG. 3 An alternative to the preceding embodiment, wherein the central opening with cylindrical form is built larger and is closed by means of a stopper, which has a seal and is secured by means of a securing ring.

The double clutch transmission 45 shown only in one detail in FIG. 3 corresponds in its structure essentially to the embodiment according to FIGS. 1 and 2 and has, in particular, with respect to the design of the axial and radial guide 34 an essentially identical structure to the embodiment of FIGS. 1 and 2. The embodiment 45, however, is different insofar as the input hub 27 used here has a central opening 42 with a larger diameter. Therefore the central opening 42 of the embodiment 45 is not closed by a meander screw 43 but by means of a stopper 46, which is fixed to the input hub 27 by means of a stopper securing ring 47. An additional seal between the input hub 27 and the stopper 46 is secured by means of a stopper sealing ring 48.

Another difference with respect to the embodiment according to FIGS. 1 and 2 can be seen in the fact that the axial guide 28 between the input hub 27 and the crank shaft 10 is not provided by the input hub 27 anymore but is provided at the stopper 46.

Thanks to the above-mentioned measures, the input hub 27 of the double clutch transmission 45 can be designed considerably more compact and thus also with reduced weight. Another advantage of the double clutch transmission 45 is that the adjustment screw 33 is significantly better accessible, when the stopper 46 is removed and thereby a central opening 42 with significantly larger diameter is revealed.

In this way, in the case of the double clutch transmission 45, not only an screw with an inside hexagon head can be used as adjustment screw 33, but also a screw with outside hexagon head can be used as adjustment screw 33.

Figure 4:
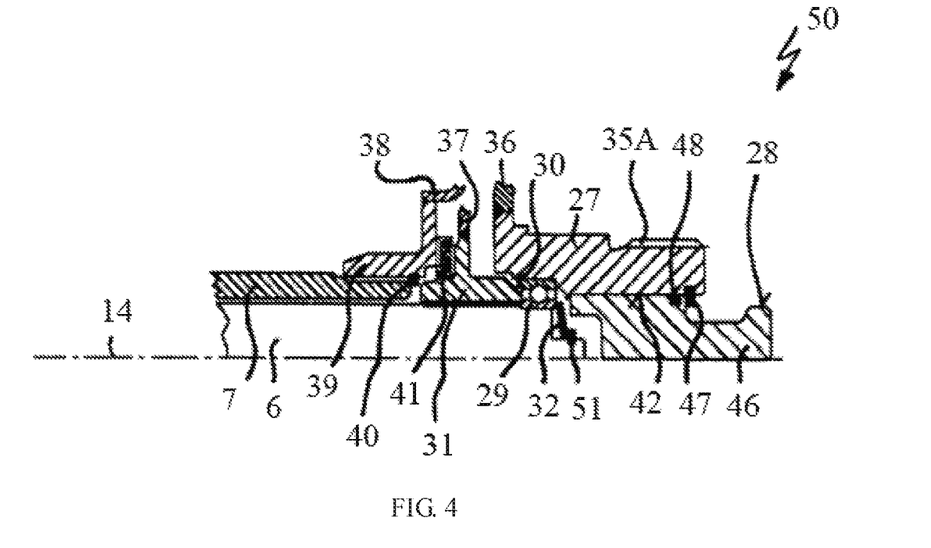
FIG. 4 An alternative to the preceding embodiment, wherein a securing ring is used instead of adjustment screw for securing the adjustment spring.

The double clutch transmission 50 shown in FIG. 4 represents an alternative to the double clutch transmission 45 of FIG. 3 since the former double clutch transmission 50 also has a stopper 46 by means of which the central opening 42 can be closed. The essential difference of the double clutch transmission 50 according to FIG. 4 compared to the preceding embodiments is that the axial support of the angular ball bearing 29 on the first input shaft 6 is performed actually with an adjustment spring 32 as well, however the adjustment screw 33 has been omitted. Instead of the adjustment screw 33, an adjustment spring securing ring 51 is provided on the first input shaft 6. This adjustment spring securing ring 51 is well accessible through the central opening 42 in case of a removed stopper 46.

Figure 5:
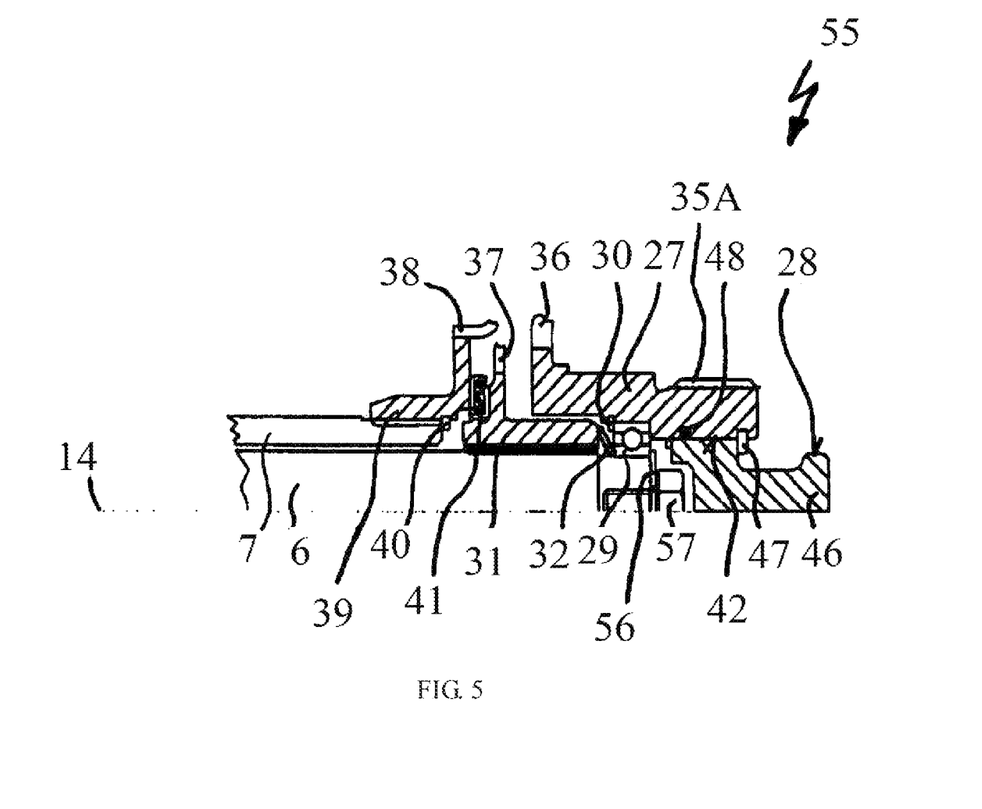
FIG. 5 An alternative to the embodiment according to FIG. 4, wherein an adjustment screw and a securing disk are used instead of the securing ring and the adjustment spring is arranged between the ball bearing and the output hub.

The alternative double clutch transmission 55 shown in FIG. 5 differs from the embodiments that have been discussed above in that the adjustment spring 32 is now arranged between the first output hub 31 and the angular ball bearing 29. The sliding of the angular ball bearing 29 from the input shaft 6 in the double clutch transmission 55 according to FIG. 5 is guaranteed by the use of a securing disk 56 which is clamped to the first input shaft 6 by means of a securing screw 57. Since the securing screw 57 is equipped with an outside hexagon head here, the central opening 42 of the input hub 27—as it has already been described above—is also closed by means of a stopper 46.

Figure 6:
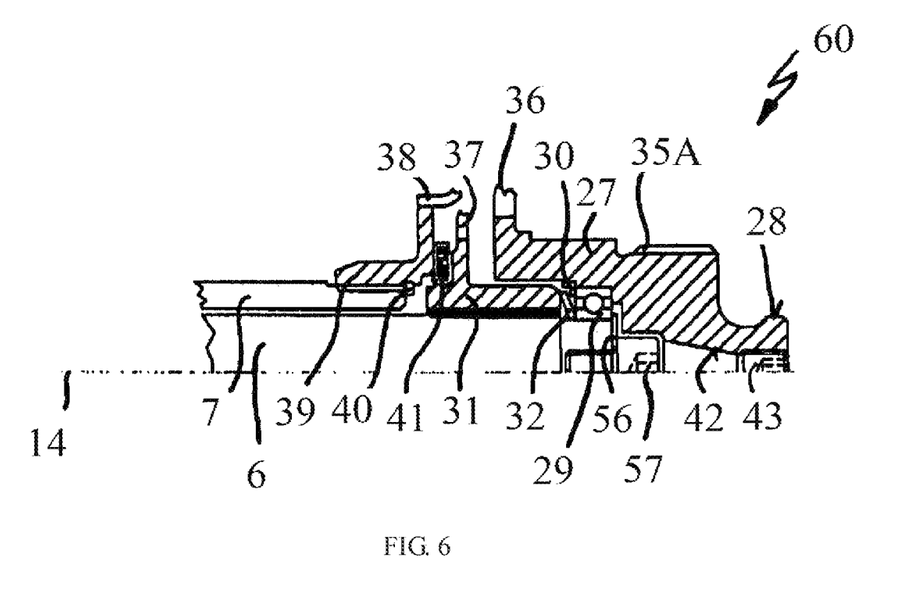
FIG. 6 An alternative to the embodiment according to FIG. 5, wherein, instead of the stopper, a central opening in the form of a cone is used and sealed by a meander screw, which feeds oil away from the meander screw.

The next double clutch transmission 60 shown in FIG. 6 closes the central opening 42 of the input hub 27 again with a meander screw 43, wherein the central opening 42, however, is built in a conical form this time and in that differs from the central openings 42 that have been described above. By means of the conically built central opening 42, the securing screw 57 used can also be restrained in a loss-proof manner to the first input shaft 6, in case it becomes detached unintentionally from the first input shaft 6. On the other hand, in this way, due to the centrifugal force oil can be fed outwards and thus the meander screw 43 is relieved.

In particular, the double clutch transmission 60 described in FIG. 6 represents an alternative to the embodiment of FIG. 5, since with the double clutch transmission 60, the adjustment spring 32 is positioned between the first output hub 31 and the angular ball bearing 29, and a securing ring 56 as well as a securing screw 57 for the axial securing of the angular ball bearing 29 to the first input shaft are provided, wherein the securing screw 57 has an inside hexagon head in this embodiment. The central opening 42, which is built with a smaller diameter, is taken into account by means of the inside hexagon head of the securing screw 57.

Figure 7:
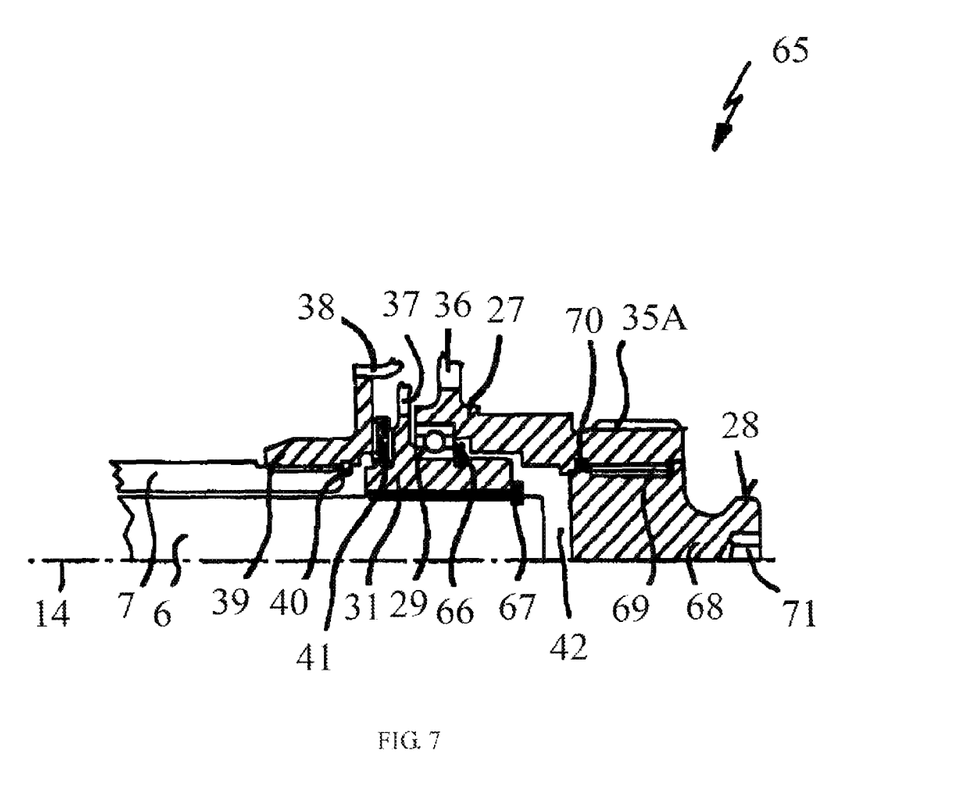
FIG. 7 An alternative to the above embodiments with a central opening in the form of a cylinder, which is closed by a screw-type element, and with a securing ring for axial securing of the first output hub on the first input shaft, wherein the input hub is supported axially and radially by the output hub.

In the double clutch transmission 65 described according to FIG. 7, the input hub 27 is supported not only axially by the first output hub 31, but, in addition, also radially. For this purpose, the angular ball bearing 29 with its inside ring sits on the first output hub 31 and is secured to the first output hub 31 by means of another securing ring 66. The first output hub 31 is secured against an axial displacement by means of another output hub securing ring 67. In this embodiment, the central opening 42 of the input hub 27 is closed by means of a screw-type element 68, wherein the screw-type element 68 is screwed by means of a screw-type thread 69 to or in the input hub 27. Between the input hub 27 and the screw-type element 68, a screw-type seal 70 is provided by which an oil leakage through the central opening 42 is prevented.

The screw-type element 68 is equipped with inside hexagon opening 71, so that it can be screwed on by means of a suitable tool in the input hub 27 or unscrewed from it without any problems. In the double clutch transmission 65 of this embodiment, the axial guide 28 between the input hub 27 and the crank shaft 10, in a similar way as in the embodiments according to FIGS. 4 and 5, is not provided directly by the input hub 27 but by the screw-type element 68 itself.

Figure 8:
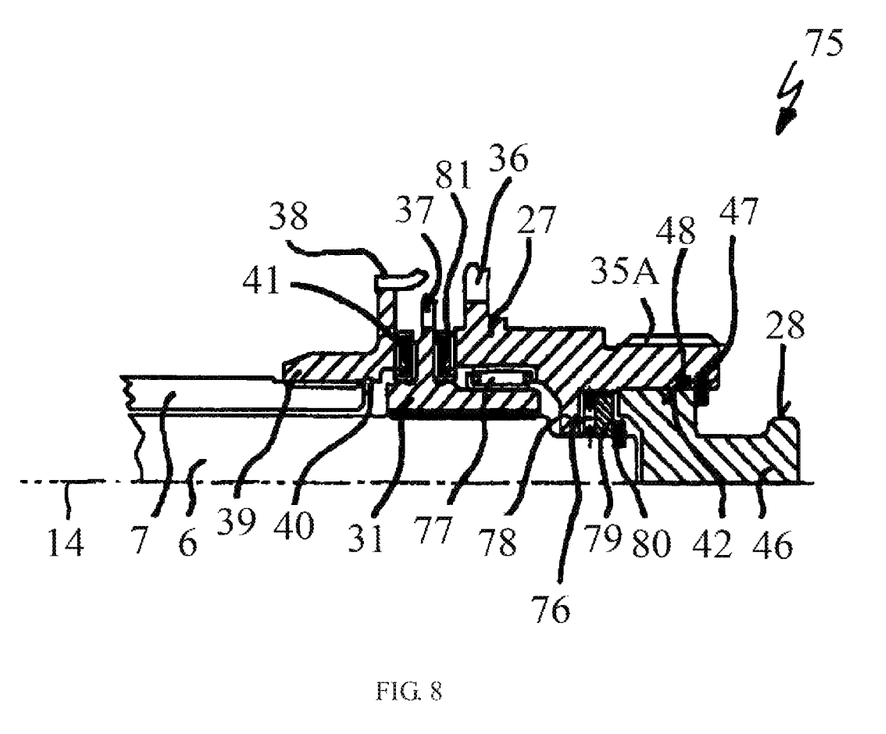
FIG. 8 An alternative, in particular, to the embodiment according to FIG. 4, wherein the ball bearing is replaced by two cylindrical roller bearings—one axial and one radial—and the first output hub is supported axially by the input hub which is in turn supported axially by the input shaft.

In the double clutch transmission 75 described according to FIG. 8, the angular ball bearing 29 used until now is replaced by an axial cylinder roller bearing 76 and by a radial axial cylinder roller bearing 77. The axial cylinder roller bearing 76 is arranged between a bearing flange 78, the input hub 27 and a bearing plate 79, wherein the bearing plate 79 is supported against a bearing plate locking ring 80, which sits positively on the first input hub 6. In this configuration, the input hub 27 is secured against axial displacement in the direction of drive unit 3.

An axial locking in direction to transmission part 5 is achieved in this embodiment by the input hub 27 being supported by the output hub 31 through another axial slide bearing 81. The first output hub 31 in its turn is supported axially by the second output hub 39 by means of the axial slide bearing 41 which, in turn, is supported by the input shaft 7.

In this embodiment, the radial cylinder roller bearing 77 is with its inner ring arranged, on the one hand, radially on the first output hub 31. On the other hand, the radial cylinder roller bearing 77 lies with its outside ring on the input hub 27, which for this purpose at least partially covers the first output hub 31.

In this embodiment, in order to ensure the accessibility, in particular, of the bearing plate securing lock 80, of the bearing plate securing lock 70 and thus of the axial cylinder roller bearing 76, the central opening 42 of the input hub 27 is again closeable with a stopper 46. The stopper 46 is fixed on the input hub 27 by means of a stopper locking ring 47.

Figure 9:
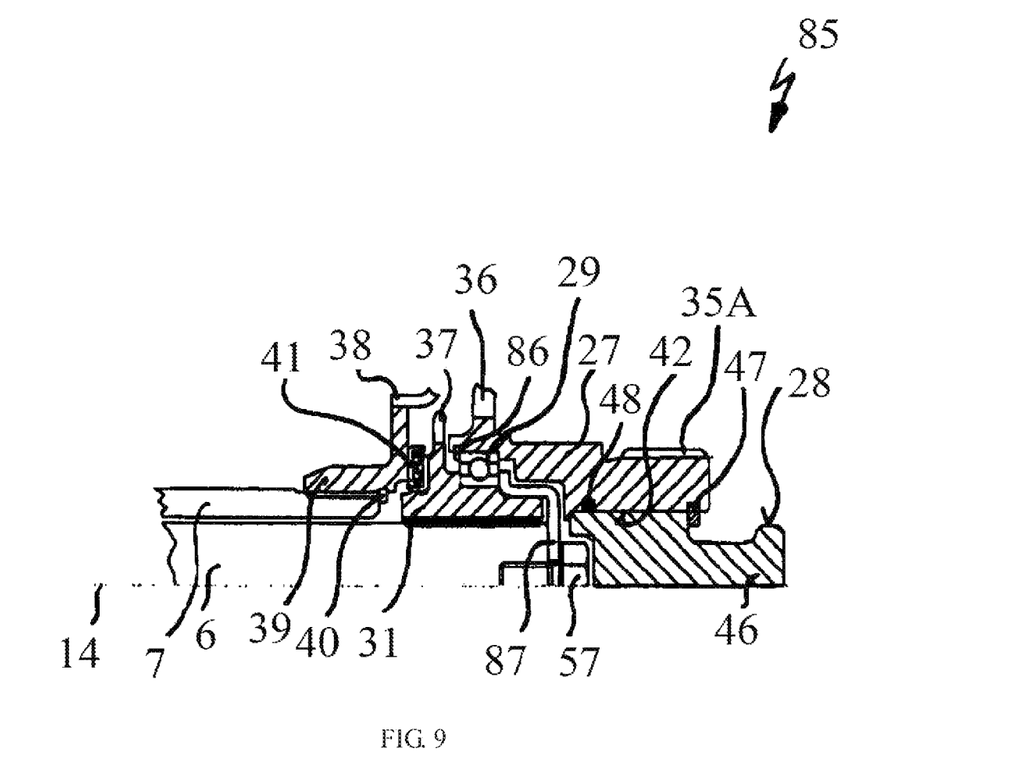
FIG. 9 An alternative, in particular, to the embodiment according to FIG. 7, wherein, however, instead of the securing disk, a securing pot is used and the input hub is supported by the first output hub and not by the corresponding input shaft.

In the double clutch transmission 85 shown in FIG. 9, the angular ball bearing 29 again sits on the first output hub 31, wherein the angular ball bearing 29 is fastened to the input hub 27 by means of an input hub locking ring 86. The angular ball bearing 29 is additionally determined in respect to the first output hub 31, as a securing pot 87 encompasses at least partially the first output hub 31 and in this way can exert pressure against the angular ball bearing 29. The securing pot 87 is fixed by means of a locking screw 57, which is screwed to in the first input shaft 6. By means of the securing pot 87, the angular ball bearing 29 is well accessible from a securing device mounted at the end of the first input shaft 6 even when the angular ball bearing 29 is positioned farther away from the end of the first input shaft 6.

Figure 10:
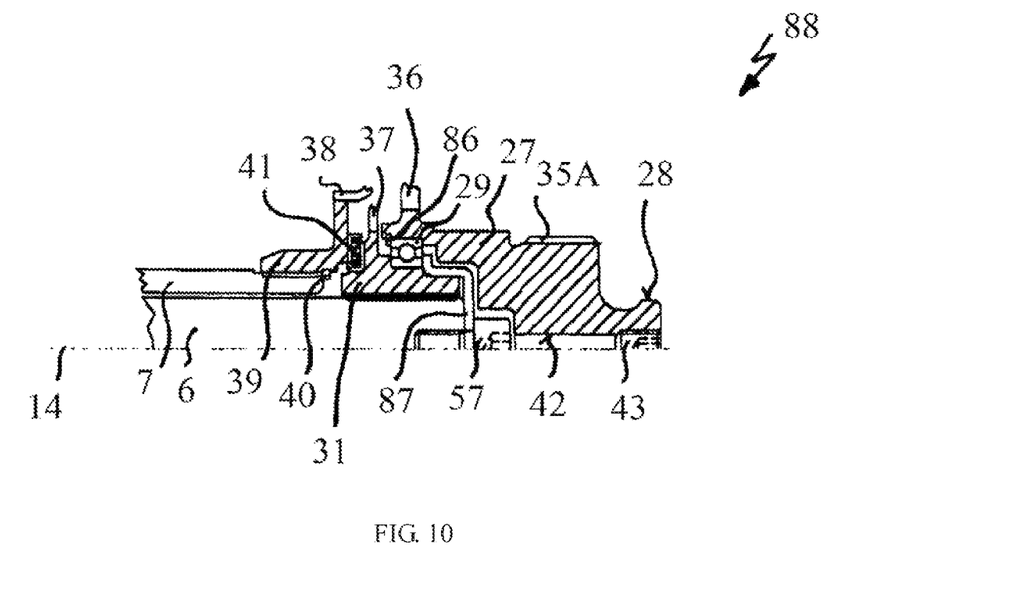
FIG. 10 An alternative to the embodiment according to FIG. 9 with a securing pot and a central opening with cylindrical form which, however, is closed by a meander opening.

One embodiment that is very similar to the embodiment according to FIG. 9 is the double clutch transmission 88 (see FIG. 10), which has an input hub 27 with significantly smaller central opening 42 that can be closed by means of a meander screw 43, as it has already been described. According to that, the locking screw 57 is provided with inside hexagon head, so that it can be screwed in or out of the first input shaft 6 through the smaller central opening 42 by means of a suitable tool.

In the double clutch transmissions 90 and 91 (see FIGS. 11 and 12), the angular ball bearing 29 sits directly on the first output hub 31 and is fixed on the input hub 27 by means of an input hub locking ring 86. The angular ball bearing 29 is locked and fixed on the first output hub 31 by means of a locking ring 56, wherein the locking ring 56 is screwed to the first input shaft 6 by means of a locking screw 57.

Figure 11:
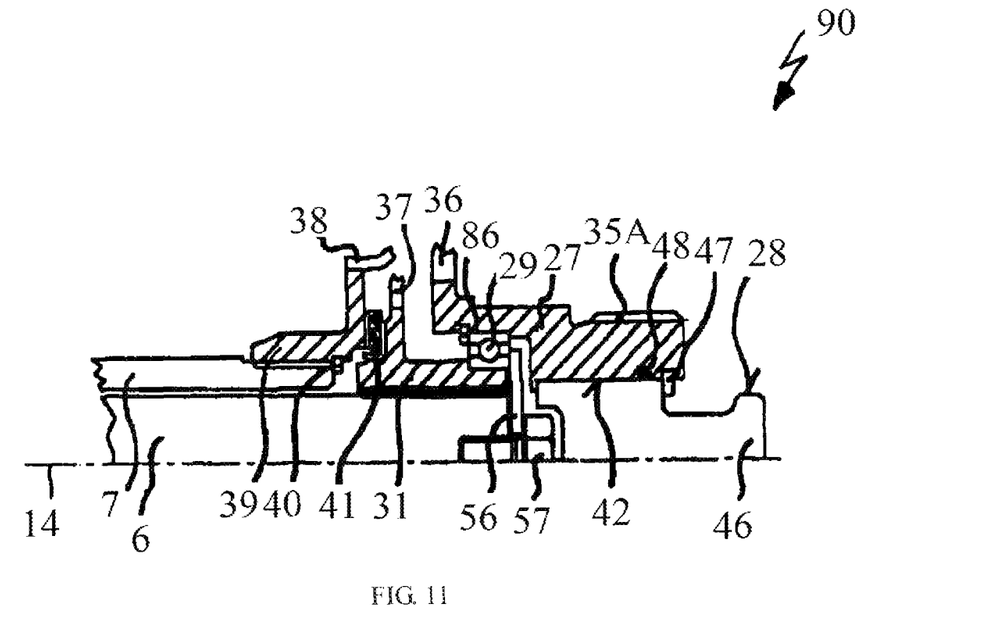
FIG. 11 Another alternative to the embodiment according to FIG. 7, wherein the securing disk, just as in the embodiments according to FIGS. 9 and 10 with the securing pot, is in contact with the ball bearing and thus the input hub is supported by the outside hub and not by the respective input shaft.
Figure 12:
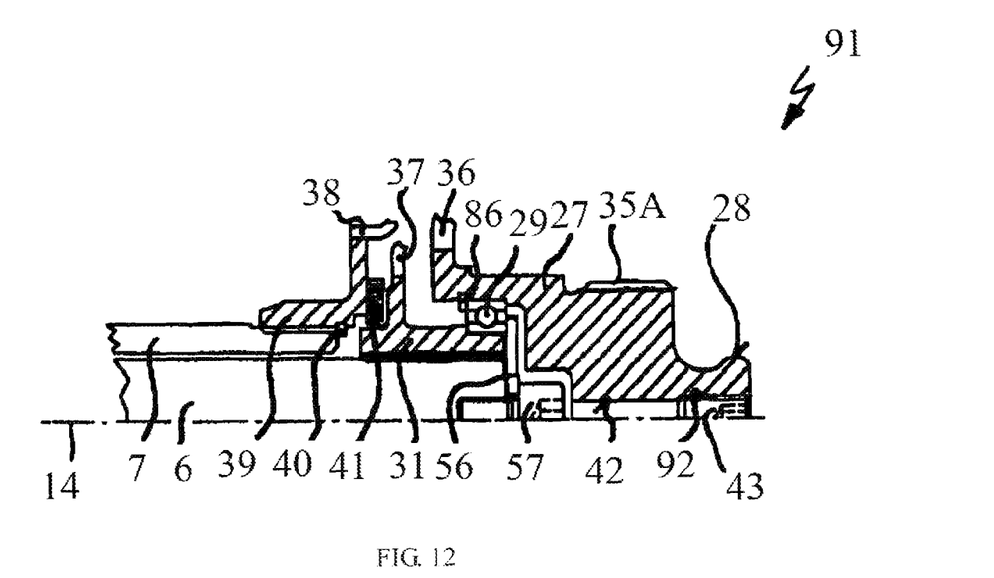
FIG. 12 An alternative to the embodiment according to FIG. 11, wherein, however, instead of a stopper, the central opening with cylindrical form is closed with a meander screw, so that the central opening is built significantly smaller and also the securing screw is maintained undetachable; however, instead of a hexagon head screw, an inside hexagon head screw is used, so that in this way the latter is easily accessible with a screwdriver.

While in the double clutch transmission 90 according to FIG. 11, a larger central opening 42 is provided on the input hub 27, which is closed in the already discussed manner by means of a stopper 46, the central opening 42 of the double clutch transmission 91 according to FIG. 12 has a central opening 42 with a smaller diameter which is closed in a oil-proof manner by means of the meander screw 43. In addition, an O-ring 92 is squeezed between the meander screw 43 and the input hub 27 and in this way additional sealing effect of the central opening 42 can be achieved.

Figure 13:
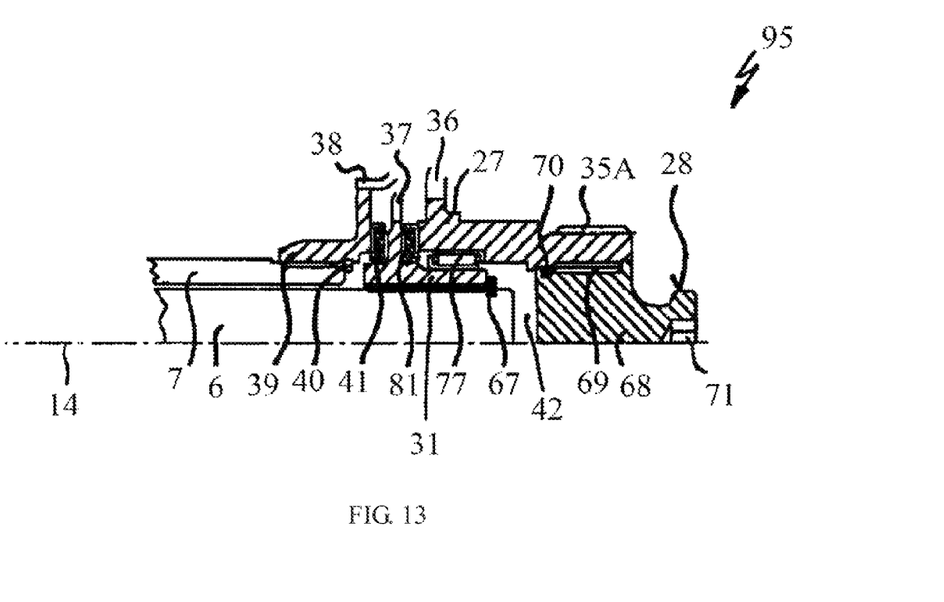
FIG. 13 An alternative to the embodiment according to FIG. 7, wherein, however, the ball bearing is replaced in its axial function by an axial sliding contact bearing and—radially—by a cylinder roller bearing or by a needle bearing.

In the double clutch transmission 95 according to FIG. 13, a sufficient axial suspension of the input hub 27 on the first output hub 31 can be achieved by means of the additional axial slide bearing 81. As a result, in this embodiment 95, not only the angular ball bearing 29 can be eliminated, but, in addition, also an axial cylinder roller bearing 76 can be skipped, as it was done in the case of the double clutch transmission 75 according to FIG. 8. By means of the additional axial slide bearing 81, the input hub 27 is supported by the first output hub 31, which in turn is supported by the second output hub 39 by means of the axial slide bearing 41. The input hub 27 is also suspended radially on the first output hub 31 by means of a radially acting cylinder roller bearing 77.

The central opening 42 of the input hub 27 is again closed with a screw-type element 68, which is screwed in by means of a screw-type thread 69 into the input hub 27.

It is understood that the embodiments, which have been discussed here in the form of examples, reflect only a limited spectrum of possibilities for the implementation of an axial and radial guide 34, which is as short and narrow designed as possible, in particular on a double transmission.

REFERENCE ELEMENTS LIST

1 Drive train
2 Double clutch transmission
3 Drive unit
4 Clutch part
5 Transmission part
6 First input shaft
7 Second input shaft
8 First clutch
9 Second clutch
10 Crank shaft
11 Flywheel
12 Crank shaft screw
13 Starter ring
14 Common rotation axle
15 Axial vibration damper
16 Flexplate
17 Holding screw connection
18 Torsional vibration damper
19 Clutch chamber
20 Antechamber
21 Clutch cover
22 Double clutch transmission housing
23 Holding ring
24 O-ring seal
25 Rotating elements
26 Clutch chamber seal
27 Input hub
28 Axial guide
29 Angular ball bearing
30 Locking ring
31 First output hub
32 Adjustment spring
33 Adjustment screw
34 Axial and radial guide
35 Axial vibration damper hub
35A Spline connection
36 Torsional vibration damper drive
37 First clutch pot
38 Second clutch pot
39 Second output hub
40 Output hub locking ring
41 Axial slide bearing
42 Central opening
43 Meander screw
44 Locking ring
45 Double clutch transmission
46 Stopper
47 Stopper locking ring
48 Stopper sealing ring
50 Double clutch transmission
51 Adjustment locking ring
55 Double clutch transmission
56 Locking disk
57 Locking screw
60 Double clutch transmission
65 Double clutch transmission
66 Locking ring
67 Output hub locking ring
68 Screw-type element
69 Screw-type element thread
70 Screw-type element seal
71 Internal hexagon
75 Double clutch transmission
76 Axial cylinder roller bearing
77 Radial cylinder roller bearing
78 Bearing flange
79 Bearing plate
80 Bearing plate locking ring
81 Axial slide bearing
85 Double clutch transmission
86 Input hub locking ring
87 Locking stopper
88 Double clutch transmission
90 Double clutch transmission
91 Double clutch transmission
92 O-ring
95 Double clutch transmission

What is claimed is:

1. A double clutch transmission (2) mounted in a drive train (1) with a drive unit (3) comprising:
a clutch part (4) and a transmission part (5) with first and second sub-transmission units;
the clutch part (4) has one input hub (27) for an operative connection with the drive unit (3) and first and second output hubs (31, 39) which are, respectively, operatively connected with first and second input shafts (6, 7) of the first and second sub-transmission units, wherein the first and second input shafts (6, 7) are arranged coaxially with respect to each other, wherein, on an output side, the input hub (27) is operatively connected with a damping mechanism (18), which is operatively connected on an the output side thereof with first and second clutches (8, 9), and the first and second output hubs (31, 39) are operatively connected, respectively, at an end of the drive unit (3) with one of the first and second clutches (8, 9) and wherein both of the first and second clutches (8, 9) and also the damping mechanism (18) are arranged in a clutch chamber (19) filled with oil, which is sealed floatingly to a clutch cover (21), the first output hub (31) is operatively connected with the first input shaft (6) and is axially supported by the first input shaft (6); the input hub (27) is supported by means of an angular ball bearing 29 on the first input shaft (6), the angular ball bearing (29) is fixed on the input hub (27) by means of a securing ring (30) and, in addition, is clamped to the first input shaft (6) by an adjustment spring (32), clamping force can be adjusted by an adjustment screw (33).

2. The double clutch transmission (2) according to claim 1, wherein the first output hub (31), is operatively connected with the first input shaft (6) and is secured on the first unit input shaft (6) against a movement directed to the drive unit (3).

3. The double clutch transmission (2) according to claim 1 or 2, wherein the first output hub (31), which is operatively connected with the first input shaft (6), the second output hub (39), which is operatively connected with the second input shaft (7), against a movement directed to the transmission part (5).

4. A double clutch transmission (2) mounted in a drive train (1) with a drive unit (3) comprising:
a clutch part (4) and a transmission part (5) with first and second sub-transmission units, wherein the clutch part (4) has one input hub (27) for an operative connection with the drive unit (3) and first and second output hubs (31, 39) operatively connected to the first and second sub-transmission units with first and second input shafts (6, 7) respectively, wherein the first and second input shafts (6, 7) are arranged coaxially with respect to each other, wherein the input hub (27) is operatively connected on an output side thereof with a damping mechanism (18), which is operatively connected on an output side thereof with first and second clutches (8, 9), and the output hubs (31, 39) are operatively connected, respectively, at an end of the drive unit (3) with one of the clutches (8, 9) and wherein both of the clutches (8, 9) and also the damping mechanism (18) are arranged in a clutch chamber (19) filled with oil, which is sealed floatingly to a clutch cover (21), the first output hub (31) operatively connected with the first input shaft (6) is secured on the first input shaft (6) by means of an angular ball bearing (29), an adjustment spring (32) and an adjustment screw (33).

5. The double clutch transmission (2) according to claim 1 or 4, wherein a clutch chamber seal (26) is arranged between the clutch cover (21) and the radially outer surface of the input hub (27).

6. A double clutch transmission (2) mounted in a drive train (1) with one drive unit (3) comprising:
a clutch part (4) and a transmission part (5) with first and second sub-transmission units, wherein the clutch part (4) has one input hub (27) for an operative connection with the drive unit (3) and operatively connected first and second output hubs (31, 39), which are, respectively, operatively connected with first and second input shafts (6, 7) of the sub-transmission units respectively, wherein the first and second input shafts (6, 7) are arranged coaxially with respect to each other, wherein, on an output side, the input hub (27) is operatively connected with a damping mechanism (18), which is operatively connected on an output side thereof with first and second clutches (8, 9), and the first and second output hubs (31, 39) are, respectively, operatively connected at an end of the drive unit (3) with one of the first and second clutches (8, 9), the first output hub (31) operatively connected with the first input shaft (6) is secured on the first input shaft (6) by means of an angular ball bearing (29), an adjustment spring (32) and an adjustment screw (33).

7. A double clutch transmission (2) mounted in a drive train (1) with one drive unit (3) comprising:
a clutch part (4) and a transmission part (5) with first and second sub-transmission units, wherein the clutch part (4) has one input hub (27) for an operative connection with the drive unit (3) and first and second operatively connected first and second output hubs (31, 39), which are, respectively, operatively connected with first and second input shaft (6, 7) of the sub-transmission units respectively, wherein the first and second input shafts (6, 7) are arranged coaxially with respect to each other, wherein, on an output side, the input hub (27) is operatively connected with a damping mechanism (18), which is operatively connected on an output side thereof with first and second clutches (8, 9), and the first and second output hubs (31, 39) are operatively connected, respectively, at an end of the drive unit (3) with one of the first and second clutches (8, 9), the first output hub (31) operatively connected with the first input shaft (6), is secured on the first input shaft (6) by means of an angular ball bearing (29), an adjustment spring (32) and an adjustment screw (33) and is supported in the input hub (27) by the angular ball bearing.

8. A double clutch transmission (2) mounted in a drive train (1) with a drive unit (3) comprising:
a clutch part (4) and a transmission part (5) with first and second sub-transmission units, wherein the clutch part (4) has one input hub (27) for operative connection with the drive unit (3) and first and second output hubs (31, 39) operatively connected, respectively, to the first and second sub-transmission units with first and second input shafts (6, 7) respectively, wherein the first and second input shafts (6, 7) are arranged coaxially with respect to each other, wherein the input hub (27) is operatively connected on an output side thereof with a damping mechanism (18), which is operatively connected on an output side thereof with first and second clutches (8, 9), and the first and second output hubs (31, 39) are operatively connected, respectively, at an end of the drive unit (3) with one of the first and second clutches (8, 9) and wherein both of the first and second clutches (8, 9) and also the damping mechanism (18) are arranged in a clutch chamber (19) filled with oil, which is sealed to a clutch cover (21), the input hub (27) is supported by means of an angular ball bearing 29 on the first input shaft (6), the angular ball bearing (29) is fixed on the input hub (27) by means of a securing ring (30) and, in addition, is clamped to the first input shaft (6) by an adjustment spring (32), clamping force can be adjusted by an adjustment screw (33) through a central opening (42) of the input hub (27), which is sealed by means of a central clutch chamber seal (43, 46, 68).

9. The double clutch transmission (2) according to claim 8, wherein the central clutch chamber seal (43, 46, 68) is detachable from the input hub (27).

10. The double clutch transmission (2) according to claim 9, wherein the central clutch chamber seal (43, 46, 68) comprises a secured stopper (46) on the input hub (27).

11. The double clutch transmission (2) according to claim 10, wherein the stopper (46) is secured by a locking ring (47).

12. The double clutch transmission (2) according to claim 9, wherein the central clutch chamber seal (43, 46, 68) comprises a screw (43, 68) on the input hub (27).

13. The double clutch transmission (2) according to one of the claims 8 to 12, wherein the central opening (42) has a smaller diameter than an adjustment screw (33).

14. The double clutch transmission (2) according to claim 1 or 4 or 6 or 7 or 8, wherein the damping mechanism (18) is a rotation vibration damper.

15. A method for assembly of the double clutch transmission (2) of claim 8, the method comprising following steps: step 1) loosening the central clutch chamber seal (43, 46, 68) of the input hub (27); step 2) adjusting the first output hub (31), which is operatively connected with the first input shaft (6), on the first input shaft (6) and then step 3) closing the central clutch chamber seal (43, 46, 68).

16. The method according to claim 15, wherein the adjustment is performed by means of the adjustment screw (33).

* * * * *